(12) United States Patent
Appleby et al.

(10) Patent No.: US 7,358,502 B1
(45) Date of Patent: Apr. 15, 2008

(54) DEVICES, SYSTEMS, AND METHODS FOR IMAGING

(76) Inventors: David Appleby, 2712 Southern Hills Ct., North Garden, VA (US) 22959; Iain Fraser, 158 Green Ct., Ruckersville, VA (US) 22968; Scott Watson, 700 Los Griegos Rd., Jemez Springs, NM (US) 87025

( * ) Notice: Subject to any disclaimer, the term of this patent is extended or adjusted under 35 U.S.C. 154(b) by 48 days.

(21) Appl. No.: 11/413,548

(22) Filed: Apr. 28, 2006

Related U.S. Application Data

(60) Provisional application No. 60/678,308, filed on May 6, 2005.

(51) Int. Cl.
*G01J 1/24* (2006.01)
*G03B 42/04* (2006.01)

(52) U.S. Cl. .................... 250/370.14; 378/184

(58) Field of Classification Search ........... 250/370.08, 250/370.09, 370.14, 580, 581, 582, 584; 378/184
See application file for complete search history.

(56) References Cited

U.S. PATENT DOCUMENTS

| | | | | |
|---|---|---|---|---|
| 5,357,118 A | * | 10/1994 | Fukuoka et al. | 250/582 |
| 5,712,486 A | * | 1/1998 | Soltani et al. | 250/484.4 |
| 6,731,718 B2 | * | 5/2004 | Ogura et al. | 378/63 |
| 6,985,555 B2 | * | 1/2006 | Endo | 378/98.11 |
| 7,214,947 B2 | * | 5/2007 | Bueno et al. | 250/370.11 |
| 7,227,926 B2 | * | 6/2007 | Kameshima et al. | 378/98.9 |
| 2004/0146140 A1 | * | 7/2004 | McCain | 378/59 |
| 2006/0273262 A1 | * | 12/2006 | Sayag | 250/484.4 |

* cited by examiner

*Primary Examiner*—David Porta
*Assistant Examiner*—Faye Boosalis
(74) *Attorney, Agent, or Firm*—Michael Haynes PLC; Michael Haynes; Dale R. Jensen (57) ABSTRACT

Certain exemplary embodiments comprise a system, which can comprise an imaging plate. The imaging plate can be exposable by an x-ray source. The imaging plate can be configured to be used in digital radiographic imaging. The imaging plate can comprise a phosphor-based image storage device configured to convert an image stored therein into light.

19 Claims, 7 Drawing Sheets

DEVICES, SYSTEMS, AND METHODS FOR IMAGING

CROSS-REFERENCES TO RELATED APPLICATIONS

This application claims priority to, and incorporates by reference herein in its entirety, now abandoned U.S. Provisional Patent Application Ser. No. 60/678,308, filed 6 May 2005.

STATEMENT REGARDING FEDERAL RIGHTS

This invention was made with government, support under Contract No. W-7405-ENG-36 awarded by the U.S. Department of Energy. The government has certain rights in the invention.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

adapted to—made suitable or fit for a specific use or situation.

adapter—a device used to effect operative compatibility between different parts of one or more pieces of an apparatus or system.

address—to access or locate.

adjacent—substantially next to.

and/or—either in conjunction with or in alternative to.

apparatus—an appliance or device for a particular purpose.

artifact—unwanted, erroneous, and/or misinterpreted information from an image.

associate—to join, connect together, and/or relate.

attach—to mechanically couple.

automatically—acting or operating in a manner essentially independent of external influence or control. For example, an automatic light switch can turn on upon "seeing" a person in its view, without the person manually operating the light switch.

bismuth—a chemical element having an atomic number of 5.

bond—to fasten things together.

boron—a chemical element having an atomic number of 83.

can—is capable of, in at least some embodiments.

cause—to produce an effect.

comprising—including but not limited to.

configure—to make suitable or fit for a specific use or situation.

configured to—made suitable or fit for a specific use or situation.

conformal imaging—obtaining an image via a plate and/or layer located substantially adjacent and/or substantially parallel to a substantially non-planar surface.

conformally—in a manner wherein a shape of a first object is modified to substantially resemble a shape of a second object.

connect—to join or fasten together.

convert—to transform, adapt, and/or change.

couple—to link in some fashion.

coupleable—capable of being joined, connected, and/or linked together.

create—to bring into being.

data—distinct pieces of information, usually formatted in a special or predetermined way and/or organized to express concepts.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the outline, form, or structure of.

determine—to obtain, calculate, decide, deduce, and/or ascertain.

device—a machine, manufacture, and/or collection thereof.

different—distinctly separate.

digital radiographic imaging—a technology for sensing, detecting, and/or rendering radiological image information via a digital format. Digital radiographic imaging comprises, e.g., Digital Radiography (DR) and Computed Radiography (CR).

distinct—distinguishable from all others.

electron—a subatomic particle in the lepton family having a rest mass of approximately $9.1066 \times 10{-}28$ grams and a unit negative electric charge of approximately $1.602 \times 10{-}19$ coulombs.

enable—to render capable for a task.

enhance—to improve or make better.

estimate—to calculate and/or determine approximately and/or tentatively.

expose—to subject a film to an action of radiation.
fastener element—a device configured to mechanically couple one thing to another.
fixedly couple—to attach in a manner that a substantially non-destructive separation thereafter is not possible.
flexible—capable of bending without a tendency to break.
gap—a space between objects.
generate—to create, produce, give rise to, and/or bring into existence.
geometric area—a defined region of a predetermined object.
granularity—a measure of a size of particles and/or image artifacts.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
high attenuation coefficient—for radiation propagating through a medium, the fractional depletion of radiance per unit path length, the fractional depletion having a relatively large magnitude.
high physical density—characterized by a relatively large mass per unit volume.
image—a representation of a similitude of a thing.
image storage—related to a device configured to act as a repository for information related to a representation of a similitude of a thing.
imaging plate—a substantially planar device configured to comprise an image responsive to an exposure to x-rays.
impinge—to collide or strike.
information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.
initialize—to prepare something for use and/or some future event.
input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.
install—to connect or set in position and prepare for use.
integrate—to form into a united whole.
intensifier—a device configured to add exposure density to an image associated with an imaging surface.
interact—to act on each other.
into—to a condition, state, or form of.
lack—a particular deficiency or absence.
large fraction of x-rays—a relatively high magnitude of a percentage of x-rays.
lateral spread of electrons—an extent to which electrons disperse over an image storage layer.
layer—a single thickness of a material covering a surface or forming an overlying part or segment.
light—electromagnetic radiation of any wavelength.
machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.
machine readable medium—a physical structure from which a machine can obtain data and/or information. Examples include a memory, punch cards, etc.
magnetic—having the property of attracting iron and certain other materials by virtue of a surrounding field of force.
may—is allowed and/or permitted to, in at least some embodiments.
memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.
metal—any of a category of electropositive elements that usually have a shiny surface, are generally good conductors of heat and electricity, and can be melted or fused, hammered into thin sheets, or drawn into wires.
metal foil—a thin film-like piece of metal.
metallic—comprising a metal.
method—a process, procedure, and/or collection of related activities for accomplishing something.
network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

non-planar object—a perceptible thing not characterizable as flat, such characterized by curves, arcs, diameters, spherical radii, inside and outside diameters of cylinders, etc.

object—something perceptible by one or more of the senses.

optical image scanner—a device that is configured to obtain a digital image from a radiographic image storage layer. Types include roller scanners and non-roller scanners.

optical image roller scanner—a device that is configured to obtain a digital image from a radiographic image storage layer by conveying, drawing, and/or pulling, using rollers or the like, the image storage layer to, by, and/or across a scanning surface, window, and/or field.

phosphor-based—comprising a substance that exhibits phosphorescence.

pixelate—to convert into pixels.

plurality—the state of being plural and/or more than one.

polymer—any of numerous natural and synthetic compounds of usually high molecular weight consisting of up to millions of repeated linked units, each a relatively light and simple molecule.

portion—a part of a larger whole.

powdered—characterized by a particle diameter of less than approximately 0.3 millimeters.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

produce—to generate via a physical effort.

project—to calculate, estimate, or predict.

provide—to furnish, supply, give, and/or make available.

receive—to get as a signal, take, acquire, and/or obtain.

recommend—to suggest, praise, commend, and/or endorse.

reduce—to make smaller.

relatively low—comparatively small in magnitude.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

segregate—to separate.

select—to make a choice or selection from alternatives.

separate—to disunite.

set—a related plurality.

source—a point at which something springs into being or from which it derives or is obtained.

storage device—a device adapted to store information for subsequent use or retrieval.

store—to place, hold, and/or retain data, typically in a memory.

substantially—to a great extent or degree.

sufficiently—to a degree necessary to achieve a predetermined result.

support—to bear the weight of, especially from below.

support structure—one or more components configured to maintain a shape and/or position of a supported structure.

system—a collection of mechanisms, devices, data, and/or instructions, the collection designed to perform one or more specific functions.

therebetween—in an interval separating a first thing from a second thing.

thereon—on or upon this, that, or it.

through—in one side and out another side of.

transmit—to send as a signal, provide, furnish, and/or supply.

transportable—capable of motion.

tungsten—a chemical element having an atomic number of 74.

use—to put into service.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

without—not accompanied by.

x-ray—electromagnetic radiation of non-nuclear origin within the wavelength interval of 0.1 to 100 Angstroms.

DETAILED DESCRIPTION

Certain exemplary embodiments comprise a system, which can comprise an imaging plate. The imaging plate can be exposable by an x-ray source. The imaging plate can be configured to be used in digital radiographic imaging. The imaging plate can comprise a phosphor-based image storage device configured to convert an image stored therein into light.

Digital radiography technology has increasingly replaced wet chemistry film processing for the capture, storage, and dissemination of X-ray images. Digital radiography was first implemented commercially in hospitals; since then, advances in microprocessing performance have allowed systems to become smaller, more efficient, and less expensive; thus broadening their appeal. The term "digital radiography" now includes two types of technology: Digital Radiography (DR) and Computed Radiography (CR). Of these two, CR has become the most popular in a wide variety of environments because it can be less expensive, less cumbersome, and compatible with earlier film technology.

CR typically uses a flexible, reusable, phosphorus imaging plate (IP) to store a latent image as a distribution of electron charges. This image can be recovered by scanning a laser beam across the IP, causing photostimulated luminescence (PSL) that then can be recorded by a photomultiplier that can be scanned across the IP at the same time as the laser. The resultant signal can be digitized, stored in a file for data processing, and/or subsequently displayed on a computer workstation, etc. From this workstation, the image can be transferred and/or thermally printed by a laser printer onto digital radiography film. Digital radiography film can be considered similar to conventional x-ray film in size, appearance, and/or ability to be viewed through backlighting, etc.; however, it typically contains no silver.

CR can allow electronic data storage, retrieval, enhancement, and/or transfer, etc. During the scanning/reading operation of the imaging plate, a digital file can be created. This original scanned image can be write-protected by the system and potentially cannot be altered. The system might allow displayed changes (e.g., intensities, changes to the gray scale, contrasts, and/or densities, etc.), which can be referred to as manipulations. The file then can be archived onto an optical disk and/or reviewed and/or manipulated on a computer workstation. Files can be transferred electronically, enabling multiple personnel to view and/or access the image file. Also, phosphor imaging plates typically can record more information than film, thus potentially allowing in-depth analysis and/or manipulation of an image. This can save labor, time, and/or reduce hazardous material usage, etc., because conventional radiography can utilize multiple shots of the same object. In addition, replacing film with phosphor imaging plates can eliminate the hazardous materials and/or hazardous waste associated with film development. Furthermore, the use of consumables can be minimized because the imaging plate can be used numerous times and/or can flex around the shape of the object. Finally, worker exposure to x-rays can be decreased since fewer shots can be used and/or phosphor-imaging plates can require considerably less radiation than conventional radiography.

X-ray detectors based on imaging plate technology can serve as the primary radiation detector in many fields, including diagnostic medical imaging, structural biology research, and/or non-destructive evaluation, etc.

An x-ray photon can be absorbed by the phosphor matrix and/or the energy of the photon can be transferred to a number of sites comprising a Europium (Eu) ion (e.g., $Eu^{2+}$), which can be oxidized (e.g., to $Eu^{3+}$) and a photoelectron can be ejected into the conduction band. The photoelectron can become trapped in a lattice defect created by the absence of a halogen (F or X) counter ion. These vacancies can be created during the manufacturing process and can be called F-centers or color centers. The F-centers can be metastable and/or thermally activated spontaneous recombination of the trapped electron and the $Eu^{3+}$ can occur. This can be called fading and can be described by a complicated exponential function.

A Helium-Neon (He—Ne) laser light ($\lambda$=approximately 632 nm) can be used to irradiate the IP to generate the photostimulated luminescence. More recently, laser diodes have become available in wavelengths ($\lambda$=approximately 658 nm) and power levels (>20 mW) considered well suited for use for reading out IPs. The visible light photons can excite the trapped photoelectron in the F-center into the conduction band where it can recombine with the $Eu^{3+}$ in less than 0.8 micro-seconds, releasing a visible light photon at $\lambda$=approximately 400 nm. This wavelength can be sufficiently different from the excitation energy that the two can be separated with interference filters and/or dichroic mirrors. The wavelength of the luminescence can be considered well matched to the detection capabilities of bi-alkali photomultiplier tubes (PMTs), which can have a sensitivity range of approximately 300 nm to approximately 600 nm.

The readout process can remove approximately 80% to 90% of a stored image. In order to prepare the IP for reuse, certain F-centers can be depopulated. This can be accomplished by bleaching the IP with visible light whose spectrum has been adjusted to enhance this depopulation.

The family of compounds comprising BaFX:$Eu^{2+}$ (X=Cl, Br) can have relatively high luminescence efficiency for X-ray excitation. The lifetime of the phosphorescence of BaFCl has been studied and BaFCl:$Eu^{2+}$ has been used in fluorescence sensitizing screens. These studies and uses have led to the development of imaging plates as a device to replace film for x-ray radiography using BaFX:$Eu^{2+}$ (X is Cl, Br, and I).

Other luminescence materials ($Zn_2SiO_4$:Mn, SrS:Ce,Sm, and RbBr:Tl, for example) have been studied for use in X-ray computed automated tomography. These materials might not comprise certain properties desired for large area imaging, e.g., an ability to be formed into large films, suitable luminescence lifetimes, etc.

For many years, the standard imaging plate was the BAS-II (HR-II) with the composition BaFBr:$Eu^{2+}$, a mixture of three different barium fluorohalides doped with europium (Eu) as an activator. More recently, a new formulation, BaFBr$_{0.85}$I$_{0.15}$:$Eu^{2+}$, has been developed. In conjunction with reduction of the particle size to approximately 5 microns, this new formulation allowed the thickness of the phosphor layer to be reduced to approximately 100 microns while increasing the sensitivity by approximately 50% for 8 Kilo electron Volts (KeV) X-rays. The resulting BAS-III imaging plate became a new standard.

A second type of IP, commonly referred to as the "blue IP", is designated as BAS-UR. This imaging plate can provide higher spatial resolution than the BAS-III. This IP gets its name from the bluish tint caused by a dye which is mixed in with the BaFBr$_{0.85}$I$_{0.15}$:$Eu^{2+}$ phosphor. The dye is used to absorb stray laser light that can reduce a spread of the photostimulated luminescence. In addition to the blue dye, the phosphor particle size is approximately 5 microns; further reducing the point spread function. If the BAS-UR imaging plate is used in conjunction with an approximately 50 micron raster, a spatial resolution of approximately 25 microns, is possible with 8 KeV x-rays. The sensitivity to 8 KeV X-rays for the BAS-UR IP is typically approximately 50% of that of the BAS-III IP.

Imaging plates typically can be sensitive not only to X-rays, but other types of radiation as well: gamma radiation, alpha and beta particles, neutrons, and/or electron beams, etc. Manufacturers of imaging plates include: Agfa (of Mortsel, Belgium), Fuji Medical (of Stamford, Conn.), Eastman Kodak (of Rochester, N.Y.), and Konica (of Ramsey, N.J.).

Imaging plates can be considered an integrating detector and the detector itself can be considered the storage medium. Imaging plates might not be used for energy discrimination or in experiments requiring very fast readout.

Imaging plates can provide seamless apertures up to approximately 400 mm×approximately 600 mm.

Imaging plates can be considered flexible. They can be exposed while curved in the Weissenberg geometry, potentially allowing for collection of data to very high resolution. The flexibility also can allow them to be exposed in a flat position and/or read out in an efficient cylindrical format.

Imaging plates can provide better than 2% error in spatial distortion or nonuniformity without correction. This can be considered comparable to CCD based detectors with corrections.

Imaging plates can have a dynamic range of up to six orders of magnitude giving them the capability to record very strong and very weak x-ray events concurrently and/or in close spatial proximity.

Imaging plates might not have significant signal accumulation (dark current) as a function of time. This means they can be used for long exposures. Imaging plates can accumulate cosmic ray events, but at a much lower rate than CCD detectors because the large mass of glass found in the taper used in CCD based detectors can be absent. Multiple exposures to correct for these cosmic ray events might not be necessary with imaging plates. Imaging plates can be considered to be less efficient for very short exposure times at very low exposure levels.

Imaging plates can have a longer readout time as compared to CCD-based detectors. However, imaging plate detectors can be capable of concurrent expose and readout, and/or concurrent exposure, readout, and/or erasure, making the duty cycle potentially limited by the speed of the transport of the imaging plate from one position to the next.

The metal screen in certain x-ray imagers can be considered to be the detector, converting the x-rays into electrons. In some cases the electrons can be detected directly and in others there can be a phosphor layer that can convert the electrons to photons that are then detected.

To improve metal screen detectors (especially at high energies) the detector can satisfy two criteria: 1) the detector can have a high attenuation coefficient so that a large fraction of the x-rays which impinge upon the detector interact with it; and 2) the detector can have a high physical density so that the lateral spread of electrons generated by the x-ray interactions is minimized.

As the density of the metal screen increases, the range of the electrons and hence their lateral spread can decrease. Thus for metal screens of the same thickness, in certain exemplary embodiments, the higher the density, the higher the modulation transfer function (MTF).

The MTF can be a quantitative way to represent the quality of the image by measuring resolution. Studies comparing the metal screen material can indicate that higher metal screen density can improve image quality (i.e., improves resolution, higher modulation transfer function (MTF)).

Close contact between the metal screen and the emulsion side of the film can impact the image resolution. (1) This can be due to the spreading of the electrons/photos as they travel from the metal screen and/or phosphor screen to the recording device (e.g., AMFPI (active matrix flat panel imager), film, diode array, and/or fluoroscopic device, etc.). If the phosphors were to some degree integrated into the metal screen, the recording device could be in a closer proximity to the screen, thus potentially improving resolution.

The use of fluorescent screens, which can convert the electrons produced in the metal layer into light, can degrade the resolution. This can be because of the spread of electrons/photons as they pass through the fluorescent screen. To potentially mitigate this affect, a scintillating material can be included in a metal screen detector system.

Using phosphor screens in metal screen detectors can improve image contrast. The low image contrast can be due to two sources: (1) the low signal contrast (i.e., the small difference in attenuation between bone and soft tissues) that can be inherent when using high-energy x-ray beams; and/or, (2) the low display contrast of films used for therapy imaging. Potentially addressing the first source for low image contrast, we recognize that light photons can carry less energy than electrons produced by irradiating a metal screen with mega-voltage photons; so one might expect that a system where light photons, for example from a fluorescent screen, are used to expose the film, rather than the electrons generated in a metal screen, the film should have more contrast. The second source of contrast degradation can be considered to have been minimized by low noise recording devices (e.g., an AMFPI (active matrix fl at panel imager), film, diode array, and/or fluoroscopic device, etc.).

The effectiveness of phosphor powders, like most imaging systems, can be considered a trade-off between efficiency and resolution. The thicker the screens, the more photons can potentially be produced, thus boosting efficiency. But as the screens get thicker, more photons can spread and/or scatter. Each can potentially cause a worsening of the resolution.

Some things to consider for potentially improving the efficiency-resolution trade-off:

Replace the phosphor in each cell with an optically clear element of scintillator material.

Use a binder that is optically transparent and has the same index of refraction as the phosphor powder.

Create light channels within the phosphor layer by adding glass micro-spheres of glass fibers allowing a path for light photons to migrate.

Companies that manufacture screens include Fuji Medical (of Stamford, Conn.), Eastman Kodak (of Rochester, N.Y.), Agfa (of Mortsel, Belgium), GE Healthcare (of Waukesha, Wi.), Liberty Technologies, Inc. (of Conshohocken, Pa.), Perkin Elmer (of Wellesley, Ma.), Hilger Analytical Ltd (of Kent, UK), Compagnie de Saint-Gobain (of Paris, Fr.), etc.

Figure 1:
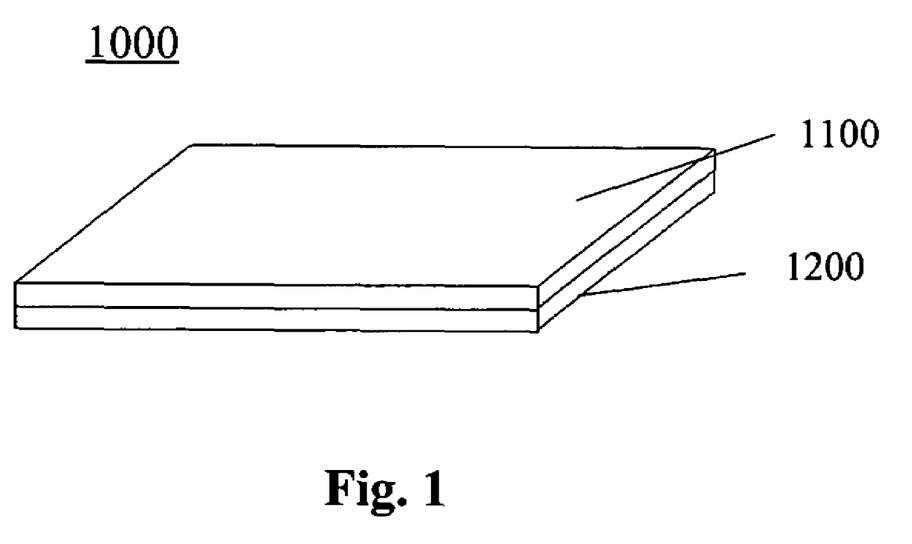
FIG. 1 is a schematic representation of an exemplary embodiment of an integrated radiographic imaging plate 1000.

FIG. 1 is a schematic representation of an exemplary embodiment of an integrated radiographic imaging plate 1000. As shown in the figure, there can be two functional sections to the radiographic imaging plate: 1) a metal screen layer, which can have a high attenuation coefficient so that a large fraction of the x-rays which impinge upon the detector can interact with it, and/or a high physical density so that the lateral spread of electrons generated by the x-ray interactions can be minimized, and/or 2) a phosphor-based image storage screen layer, which can convert the electrons produced in the metal layer into light.

The two sections can be bonded together to form a single flexible structure (an integrated radiographic imaging plate).

The following sections describe an exemplary embodiment of a detailed process that can be used to produce exemplary embodiments of the integrated radiographic imaging plate having dimensions of approximately 14"× approximately 17"×approximately 0.04"

Tungsten (or other) metallic powder of a specified mesh size and tap density can be utilized. For the present example, tungsten powder having a mesh size of approximately −60 and a tap density of approximately 11.3 g/cc was used. Tungsten powder was procured from the Buffalo Tungsten Corporation of Depew, N.Y.

Polymer of a specified flexibility (durometer) and durability sufficient to withstand exposure to the anticipated radiation can be utilized. For the present example, ResinLab UR3010 two-part flexible polymer epoxy was used. A hard durometer, non flexible polymer, TC-1614 Resin procured from BJB Enterprises of Tustin, Calif., was also used to produce a rigid metal screen.

Figure 2:
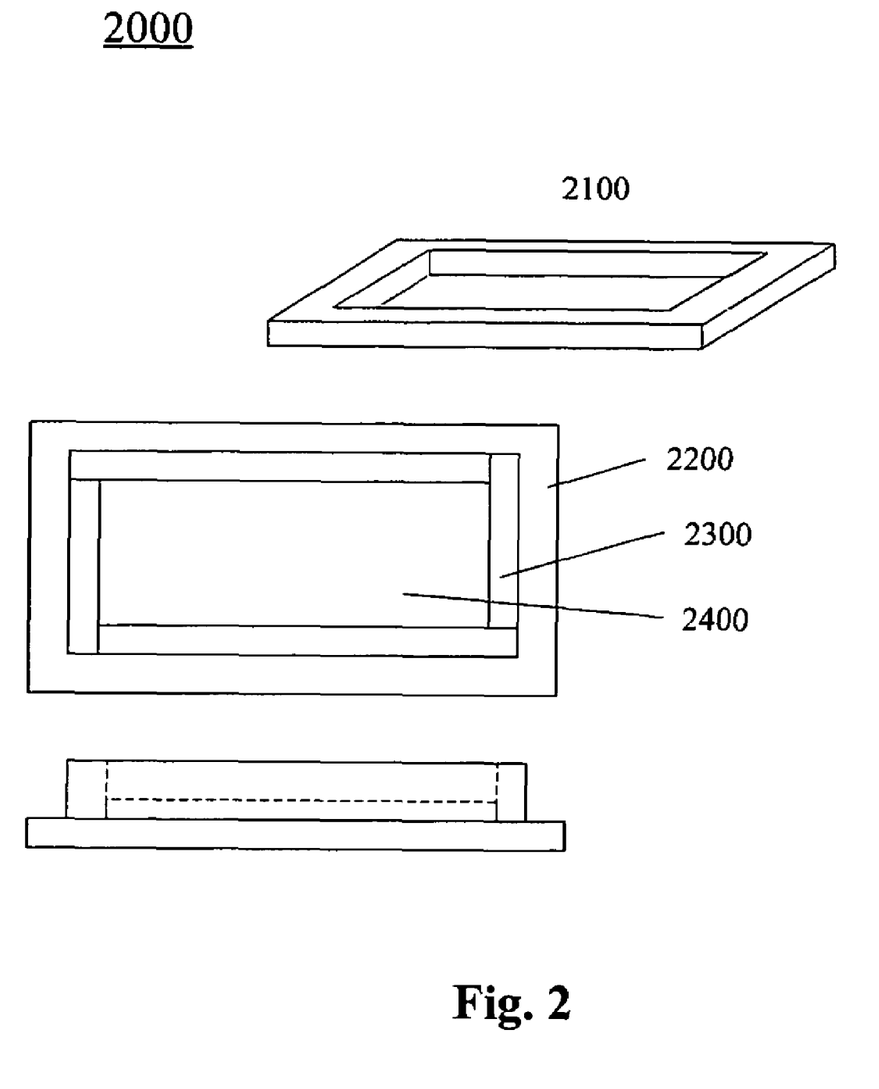
FIG. 2 is a schematic representation of an exemplary embodiment of a mold fixture 2000.

FIG. 2 is a schematic representation of an exemplary embodiment of a mold fixture 2000. A mold fixture similar to that shown in FIG. 2, providing a cavity having the required length, width, and height for the imaging plate can be utilized. For the present example, the dimensions were approximately 14"×approximately 17"×approximately 0.04"

Figure 3:
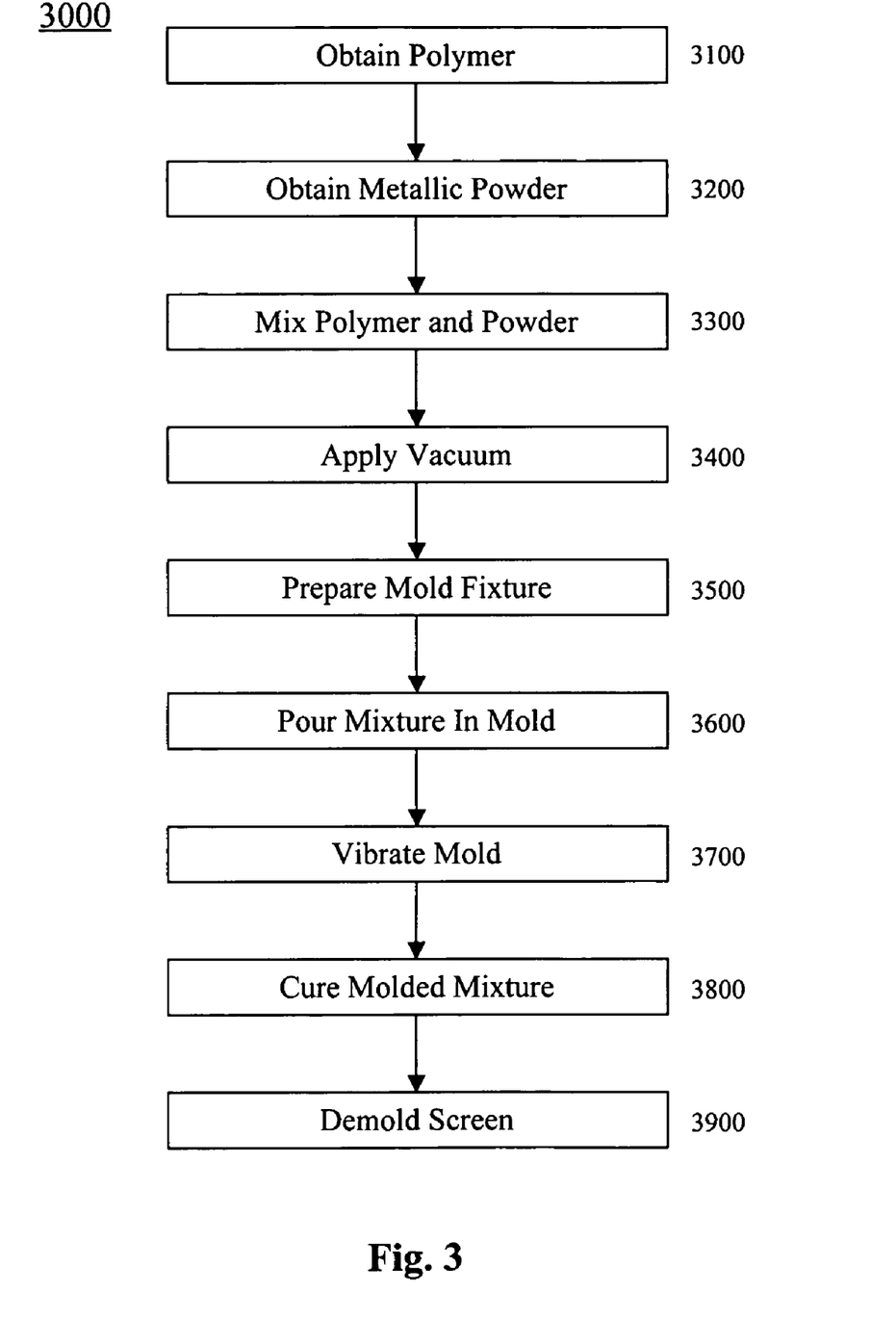
FIG. 3 is a flowchart of an exemplary embodiment of a method 3000.

FIG. 3 is a flowchart of an exemplary embodiment of a method 3000. At activity 3100, polymer can be obtained. At activity 3200, metallic powder can be obtained.

At activity 3300, the polymer and the metallic powder can be mixed. For example, carefully weighed amounts of the two-parts of the polymer can be mixed together per the manufacturer's instructions using manual and/or mechanical techniques to obtain a homogeneous mix. A carefully weighed amount of tungsten powder can be slowly mixed together with the two-part polymer mixture using manual and/or mechanical mixing tools to obtain a homogeneous mix. The ratio of tungsten particles and polymer can be varied to lower the viscosity and/or raise the density of the mixture. Exemplary values presented hereafter in this paragraph are approximate and, thus, not limiting in their application. To produce a flexible metal screen, 425 grams of ResinLab UR3010 and 3400 grams of tungsten powder can be used (8:1 ratio), or 340 grams of ResinLab UR3010 and 3400 grams of tungsten powder can be used (10:1 ratio), or 283 grams of ResinLab UR3010 and 3400 grams of tungsten powder can be used (12:1 ratio), or 243 grams of ResinLab UR3010 and 3400 grams of tungsten powder can be used (14:1 ratio), or 375 grams of ResinLab UR3010 and 3000 grams of tungsten powder can be used (8:1 ratio), or 300 grams of ResinLab UR3010 and 3000 grams of tungsten powder can be used (10:1 ratio), or 250 grams of ResinLab UR3010 and 3000 grams of tungsten powder can be used (12:1 ratio), or 214 grams of ResinLab UR3010 and 3000 grams of tungsten powder can be used (14:1 ratio). To produce a rigid metal screen, 425 grams of BJB TC-1614 Resin and 3400 grams of tungsten powder can be used (8:1 ratio), or 340 grams of BJB TC-1614 Resin and 3400 grams of tungsten powder can be used (10:1 ratio), or 283 grams of BJB TC-1614 Resin and 3400 grams of tungsten powder can be used (12:1 ratio), or 243 grams of BJB TC-1614 Resin and 3400 grams of tungsten powder can be used (14:1 ratio), or 375 grams of BJB TC-1614 Resin and 3000 grams of tungsten powder can be used (8:1 ratio), or 300 grams of BJB TC-1614 Resin and 3000 grams of tungsten powder can be used (10:1 ratio), or 250 grams of BJB TC-1614 Resin and 3000 grams of tungsten powder can be used (12:1 ratio), or 214 grams of BJB TC-1614 Resin and 3000 grams of tungsten powder can be used (14:1 ratio).

At activity 3400, a vacuum can be applied to the mixture. For example, the mixed tungsten and polymer can be placed in a vacuum chamber for one or more cycles in which the vacuum can be increased until the mix "breaks" releasing trapped air, and then collapses.

At activity 3500, a mold fixture can be prepared. For example, the mold fixture can be thoroughly cleaned using isopropyl alcohol, and a mold release (Sprayon S00311) can be sprayed on so as to cover every part of the fixture where the poured mix will be in contact with the fixture.

At activity 3600, the mixture can be poured in the mold. For example, the mixed tungsten powder and polymer then can be poured into the cavity formed by the mold fixture. This can be done in one or more of several ways, including manually pouring and/or using a mechanical dispenser that can be automated.

At activity 3700, the mold can be vibrated. For example, the mold fixture can be attached to a vibration table and vibrated for a period of time sufficient to allow the tungsten powder particles to settle to the bottom of the cavity and the polymer to rise to the top. The amount of time required can depend upon many factors including the table type, the vibration action (linear or rotary), table manufacturer, the particular tungsten powder and polymer materials used, and/or the density required in the final metal screen, etc. For the example, an FMC J-50 linear action Jogger table was used at a power setting of 3600 pulses per minute for approximately 15 minutes.

In certain exemplary embodiments, an excess of polymer can be removed. For example, after vibrating, excess polymer can be removed using a squeegee and/or vacuum device to achieve the desired final thickness of the metal screen, and if needed to prepare for addition of the phosphor-based imaging screen as described below.

At activity 3800, the mixture can be cured. For example, the fixture then can be removed from the vibration table and/or allowed to cure. This can be done at room temperature and/or put in an oven at elevated temperature to reduce the cure time. For the example, the fixture can be stored in a flat horizontal rack for approximately 24 hours at room temperature.

At activity 3900, the metal screen can be demolded. For example, the cured metal screen can be demolded from the fixture and/or left in the fixture if further operations are required (e.g., adding the phosphor-based imaging screen). When demolding, care can be taken to avoid tearing along the outside edges and especially in corners of the mold fixture.

One embodiment of the radiographic imaging plate can involve acquiring a flexible phosphor-based imaging sheet from a commercial vendor (e.g. Fuji, Kodak, etc.) and bonding the sheet to the metal screen as produced above. This can be done in a number of different ways. One method can be to lay the imaging sheet on top of the uncured liquid polymer that has risen to the top of the metal screen during the vibration cycle. The resulting assembly then can be allowed to cure into a single structure having the imaging sheet imbedded, bonded, and/or permanently attached to the top of the metal screen.

Alternatively, if desired, the imaging sheet can be produced as part of the metal screen. In this approach, phosphor powder can be introduced directly into the uncured polymer layer that has risen to the top during the vibration cycle described above. The phosphor powder can be dispensed in one of several ways in order to provide a uniform layer of phosphor into the uncured polymer. This can be done using a powder dispenser and/or spray mechanism, and can involve an additional vibratory cycle to assure a thorough mix and/or better adhesion to the metal screen. To accommodate this additional step in the metal screen production, the polymer can be chosen to have a longer working time before curing. Alternatively, a separate mixture of phosphor powder and polymer can be made, and then poured over the metal screen. This can be done before or after the metal screen has fully cured, in which case most of the uncured polymer that has risen to the top of the metal screen can be removed prior to pouring the phosphor powder mixture. As the poured phosphor and polymer mixture cures, the phosphor-based imaging layer can become permanently attached and/or bonded to the metal screen.

For some applications, it can be desirable to have a minimum gap between the metal screen and the phosphor-based imaging layer. This can be accomplished by removing as much uncured polymer as desired from the metal screen, then introducing the phosphor-based imaging screen either as a separate item, or the phosphor powder and polymer mixture. Alternatively, after removing the uncured polymer layer at the top of the metal screen, the metal screen can be allowed to fully cure, and succeeding operations can be used to clean and remove any residual polymer prior to introducing and attaching the phosphor-based imaging screen.

For some applications, it can be desirable to increase the density of the phosphor-based imaging layer. This can be accomplished by including very small (approximately 1-5 micron tungsten (or other metallic powder)) particles in the powder mix. During the vibratory cycle, the very small particles might not settle as well as the larger size particles, but can remain in suspension in the polymer that has risen to the top of the metal screen. If the phosphor powder is then added to this higher density polymer, improved image resolution can result. It is understood, however, that the higher density polymer mixture might result in somewhat lower light output, which might be acceptable for some applications.

Certain exemplary embodiments can avoid the use of lead, which can be considered to: be toxic, be regulated in the U.S. under the Resource Conservation and Recovery Act (RCRA), have a relatively low density, have a relatively large secondary electron and gamma range, be hard to handle, and/or be easy to damage, etc.

Certain exemplary embodiments can form easily to odd shapes, such as for weld inspection, aircraft wings, and/or other "conformal" geometries, etc. Certain exemplary embodiments might be usable in automatic feeder-type optical image roller scanners where phosphor screen can travel through the scanner.

Certain exemplary embodiments can be rolled up instead of necessarily being flat, which can potentially be advantageous at larger sizes.

Certain exemplary embodiments can provide metal screens that are rigid or are flexible, in a planar configuration.

Certain exemplary embodiments can provide metal screens that are rigid or are flexible, in a non-planar configuration.

Certain exemplary embodiments can provide a higher Z, which, at low energies, can increase stopping power. At medium and high energies, the higher Z can limit secondary electron range, secondary gamma range, which can be considered good effects.

Certain exemplary embodiments can provide a higher density, which can be considered to be a minor advantage until lead-like density is exceeded. At that point, resolution at mega-volt energies can increase roughly proportionally to density. Higher densities can provide higher stopping power per given thickness.

Certain exemplary embodiments can be manufactured with phosphor in direct contact with the screen (and/or mixed in). This technique can eliminate a need for a (low density) polyester backing and/or can increase resolution.

Certain exemplary embodiments can utilize one or more of a wide variety of powder types (e.g. copper, tungsten, nickel, and/or tin, etc.), blends, slurries, and/or alloys. For example, materials less dense than lead, such as copper, might be useful for low energy radiography applications. Use of such lower density materials can allow x-ray photons through the screen that would normally be stopped by lead because of lead's higher cross-section at that energy. Certain exemplary embodiments can allow one to tailor the filtration to some degree, which can be considered by some to be somewhat analogous to using a colored filter in ordinary photography.

Certain exemplary embodiments can introduce other dopants into the powder, thereby making it possible to tailor performance for other, more exotic applications. For example, Boron can be introduced into the mix to potentially increase performance for neutron radiography (Boron can be considered to have a high capture cross-section for many flavors of neutrons and the capture gamma can be considered to provide the exposure). Other dopants can be introduced to effect exposure to other particle types (e.g., protons, etc.), and/or to tailor the response to x-rays and/or electrons. Certain exemplary embodiments can dope the intensification screen independently (and/or in conjunction with) the phosphor.

Certain exemplary embodiments can be robust to explosive and/or high shock environments.

Certain exemplary embodiments can have application in auto-radiography (NOT necessarily automobile) applications where the radioactive material is deposited in with the screen.

Certain exemplary embodiments can be useful for "collimator" geometries, such as a "bucky grid." Such geometries can have potential at low energies for protons (where the lateral scatter can be a problem, etc.) Certain exemplary embodiments can involve loading plastic or other scintillator material after the initial casting.

Certain exemplary embodiments can provide radiation shielding due to the radiation attenuation properties of the tungsten particles.

Certain exemplary embodiments can provide a latent image. For example, by shaping the intensification screen surface, a latent image can be made present on the final radiographic image. This technique can be used for including a logo and/or advertisement on a radiograph, artistic impressions, and/or geometric fiducials (e.g. a centering mark and/or grid), etc. For example, such a screen can be used to accurately calibrate geometric distortion of existing optical image scanners, which can have a typical geometric distortion of approximately 1-2%. Because certain exemplary embodiments of the screens can be manufactured much more accurately than that, they could be used as a fiducial to perform such a calibration. For example, a geometric fiducial could be embedded in each corner of a 14"×17" metal screen with a distance tolerance between each fiducial of approximately 0.0015%.

A comparison test was performed using a Fuji 14"×17" medical phosphor screen with a 0.020" rigid tantalum metal sheet on both sides of the Fuji screen (assembly referred to as metal screen). A 0.5 cm thick tungsten resolution target, having resolution fiducial markings (openings through the 0.5 cm thick tungsten plate) indicating line pairs per millimeter, was then placed in front of the metal screen. The fiducials on the tungsten resolution target were then imaged onto the phosphor screen by passing a radiation beam through the openings on the resolution target allowing the radiation beam to selectively interact with the metal screen. The radiation beam was generated using a linear accelerator, which produced an image spot size of approximately one millimeter at an energy level of 20 million electron volts (MeV). The metal screen was then disassembled and the phosphor screen was processed through a Fuji optical image roller scanner to retrieve of the radiographic image of the resolution target by obtaining a digitized sample of the image information stored in the phosphor screen. The fiducial markings could then be used to measure the image resolution performance of the metal screen.

The test was then repeated using the same Fuji 14"×17" medical phosphor screen with 0.040" flexible tungsten sheet on both sides of the Fuji screen (assembly referred to as the flexible metal screen). Both tests used a radiographic magnification of 4, a filtered spectrum, and a standard compression pack.

Figure 4:
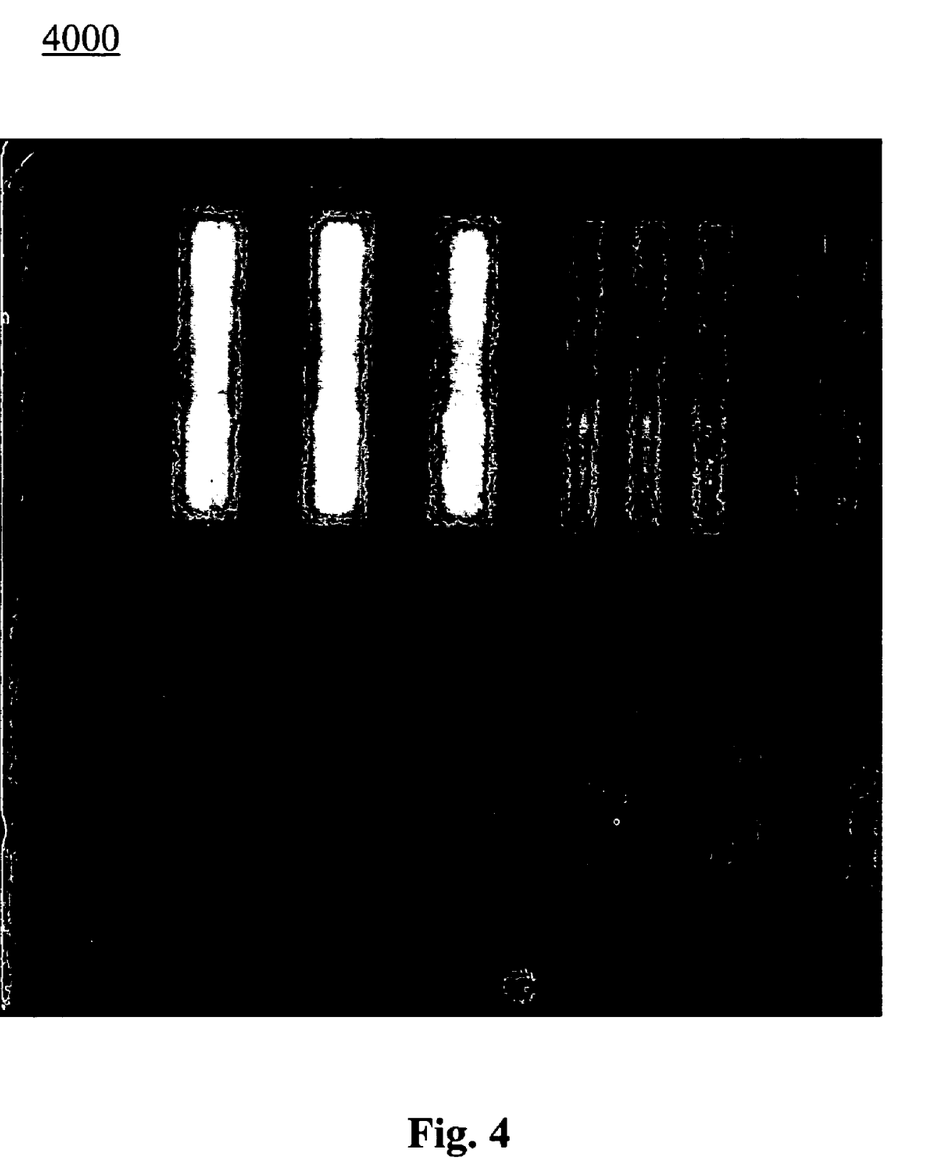
FIG. 4 is an exemplary embodiment of an image 4000.
Figure 5:
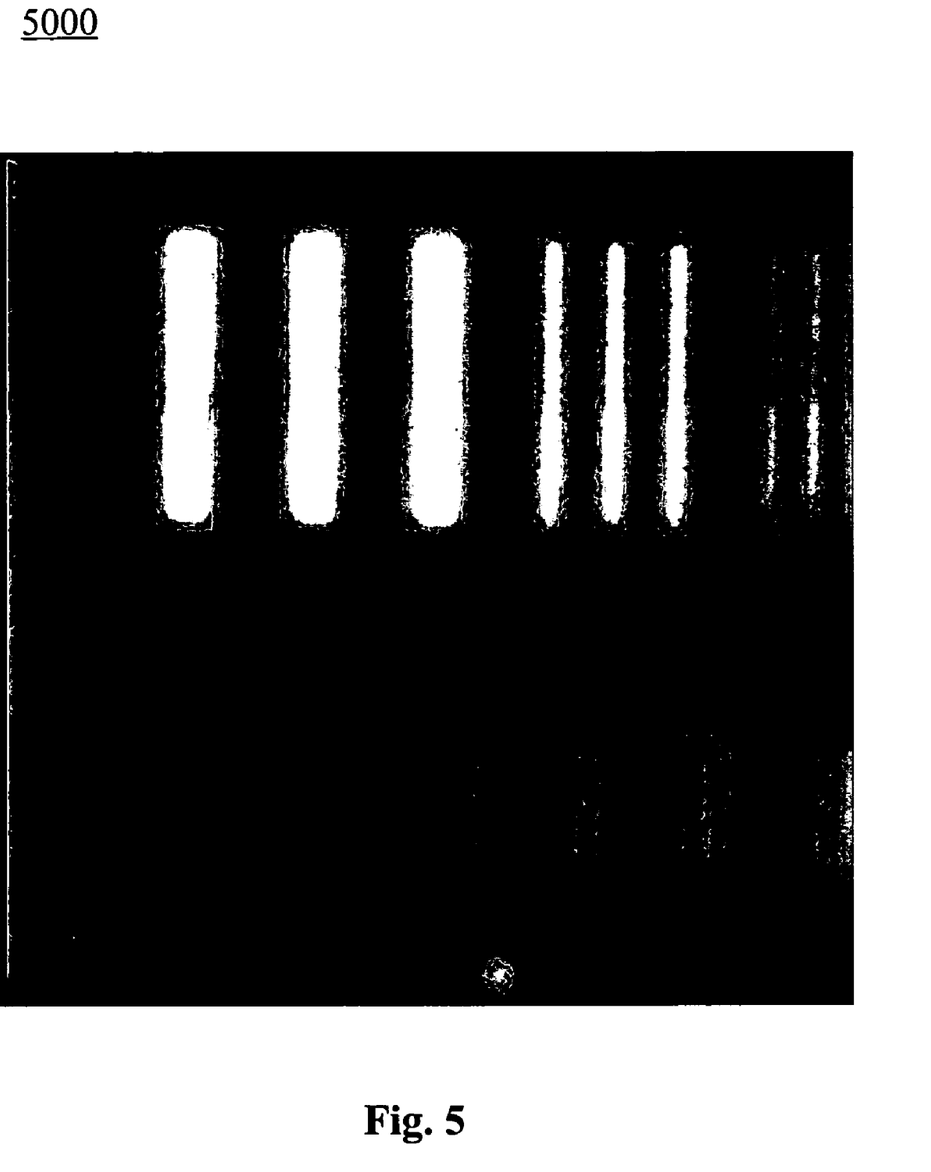
FIG. 5 is an exemplary embodiment of an image 5000.

FIG. 4 is an exemplary embodiment of an image 4000. FIG. 5 is an exemplary embodiment of an image 5000. The images (FIG. 4 and FIG. 5, respectively) obtained from the metal and flexible screens were then visually inspected and compared using the fiducial markers on the resolution target. The tantalum metal screens are known to produce better results than standard lead screens. Some image artifacts were detected on both test images, which were produced by existing scanner or screen defects.

Figure 6:
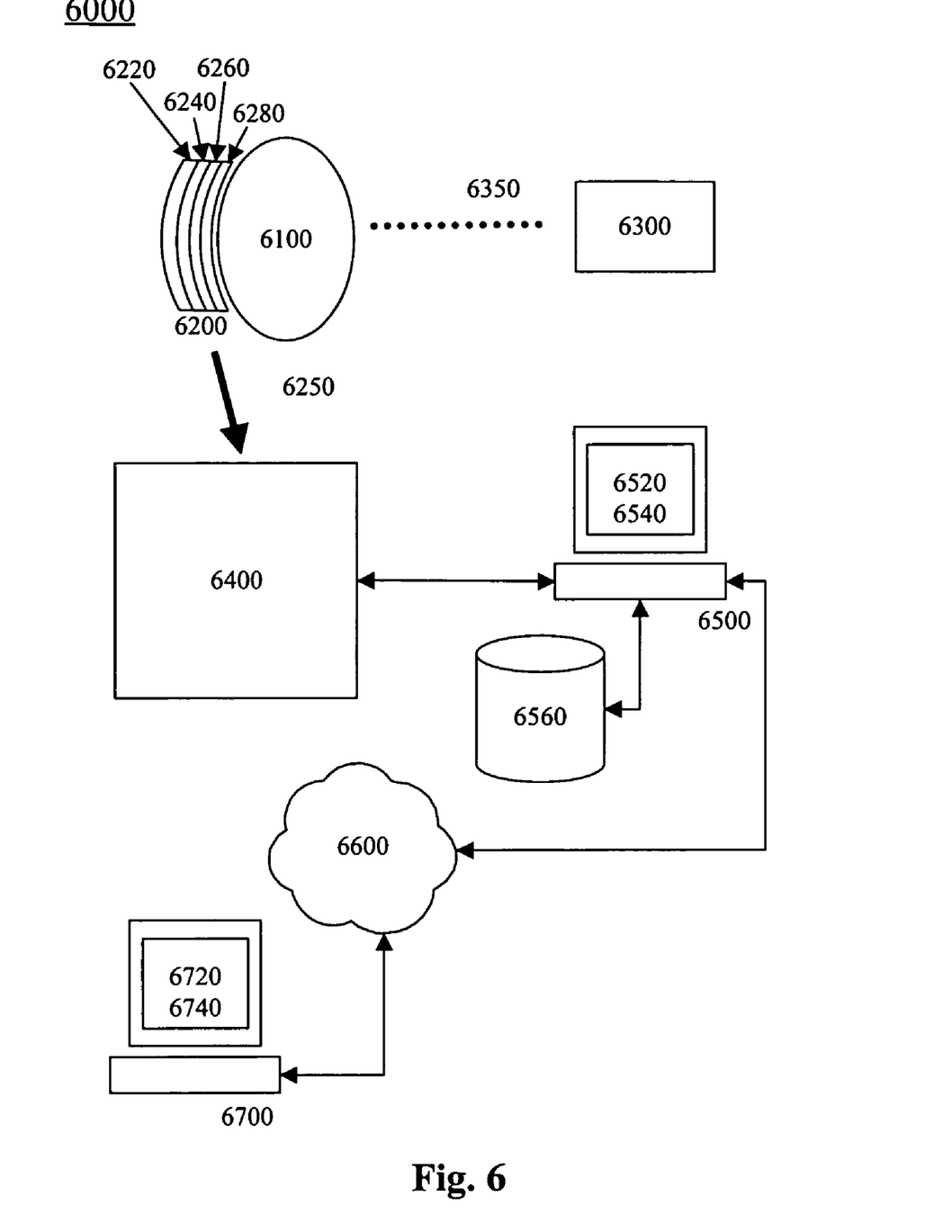
FIG. 6 is a block diagram of an exemplary embodiment of a system 6000.

FIG. 6 is a block diagram of an exemplary embodiment of a system 6000, which can comprise an object 6100 for which radiographic imaging is desired. Object 6100 can comprise one or more non-planar surfaces. For example, object 6100 can be all and/or part of a human body, animal body, vessel, pipe, briefcase, luggage, package, machine, vehicle, aircraft, spacecraft, ship, submersible, and/or information device, etc. An imaging plate 6200 can be placed adjacent to object 6100 to obtain a radiographic image thereof. Imaging plate 6200 can obtain an image of object 6100 via an exposure from an x-ray source 6300. X-rays 6350 can be emitted from x-ray source 6300 to expose an image of object 6100 on imaging plate 6200.

Imaging plate 6100 can comprise an intensifier 6240 and/or a storage device 6220. In certain exemplary embodiments, intensifier 6240 can be substantially metallic and can comprise tungsten. In certain exemplary embodiments, intensifier 6240 can be closely integrated with storage device 6220. In certain exemplary embodiments, intensifier 6240 can be bonded to storage device 6220. In certain exemplary embodiments, imaging plate 6200 can substantially lack a gap between intensifier 6240 and storage device 6220. In certain exemplary embodiments, a polymer layer substantially lacking a metal and/or containing a low concentration of a metal (such as tungsten) can separate, define a predetermined width, and/or define a gap between intensifier 6240 and storage device 6220. Storage device 6220 can be substantially fixedly coupled to intensifier 6240. Storage device 6220 can be substantially adjacent to intensifier 6240.

In certain exemplary embodiments, one or more tracers or neutron absorbers (e.g., boron) can be added to intensifier 6240 for specialized applications such as neutron radiography. In certain exemplary embodiments, intensifier 6240 and/or storage device 6220 can lack a support structure such as, for example, a substrate.

In certain exemplary embodiments, intensifier 6240 can be configured to segregate storage device 6220 into distinct geometric areas and/or pixelate an image storable in storage device 6220. In certain exemplary embodiments, storage device 6220 can be configured to allow different portions of an image stored thereon to be enhanced and/or separately addressed. Storage device 6220 can be configured to comprise image information stored thereon. Storage device 6220 can be a phosphor-based image storage device configured to convert electrons produced in intensifier 6240 into light.

In certain exemplary embodiments, imaging plate 6200 can comprise an integrated magnetic layer 6280 that can provide a means of releasably attaching imaging plate 6200 to object 6100. The means can comprise a magnetic material configured to releasably bond to a magnetic surface of and/or adjacent to object 6100. Imaging plate 6200 can be sufficiently flexible to bond to a substantially object and/or a substantially non-planar surface of object 6100. For example, the substantially non-planar surface of object 6100 can be a concave, convex, curvilinear, surface, and/or can comprise a planar surface discontinuity, etc.

In certain exemplary embodiments, imaging plate 6200 can comprise a metallic foil layer 6260, which can comprise a metal such as copper, stainless steel, carbon steel, aluminum, zinc, and/or tin, etc. Metallic foil layer 6260 can be configured to reduce granularity artifacts caused by tungsten particles at energies below approximately one MeV. Metallic foil layer 6260 can be utilized to enable a full or partial substitution of tungsten by a metal that might be less expensive than tungsten, such as bismuth, in intensifier 6240. Metallic foil layer 6260 can be configured to provide improved mechanical properties for imaging plate 6200, such as for tear strength, coefficient of thermal expansion (CTE), flexibility, and/or surface protection for storage device 6220, etc.

In certain exemplary embodiments, an image of object 6100 exposed on storage device 6220 of imaging plate 6200, such as analog image information, can be sampled and/or read via an optical image scanner 6400 to produce digital image information. In certain exemplary embodiments, scanner 6400 can be a optical image roller scanner. In certain exemplary embodiments, imaging plate 6200 can be sufficiently flexible to be transportable through scanner 6400 without separating intensifier 6240 from storage device 6220.

Scanner 6400 can be communicatively coupled to an information device 6500, which can be configured to store digital image information sampled from storage device 6220 via scanner 6400, a portion of the digital image information, and/or a digital sample of the image information. Information device 6500 can comprise a user program 6520, a user interface 6540, and/or a memory device 6560. User program 6520 can be configured to render and/or process at least a portion of the digital image information obtained from scanner 6400. User interface 6540 can be configured to render the digital image information and/or an image related to the digital image information obtained from scanner 6400. Memory device 6560 can be configured to store the digital image information for processing, communication, and/or rendering, etc., such as in memory device 6560.

Information device 6500 can be communicatively coupled to a networked information device 6700, which can comprise a user interface 6740 and/or a user program 6720. User program 6720 can be configured to render and/or process the digital image information obtained from scanner 6400. User interface 6740 can be configured to render, manage, and/or otherwise process the digital image information and/or an image related to the digital image information obtained from scanner 6400.

Figure 7:
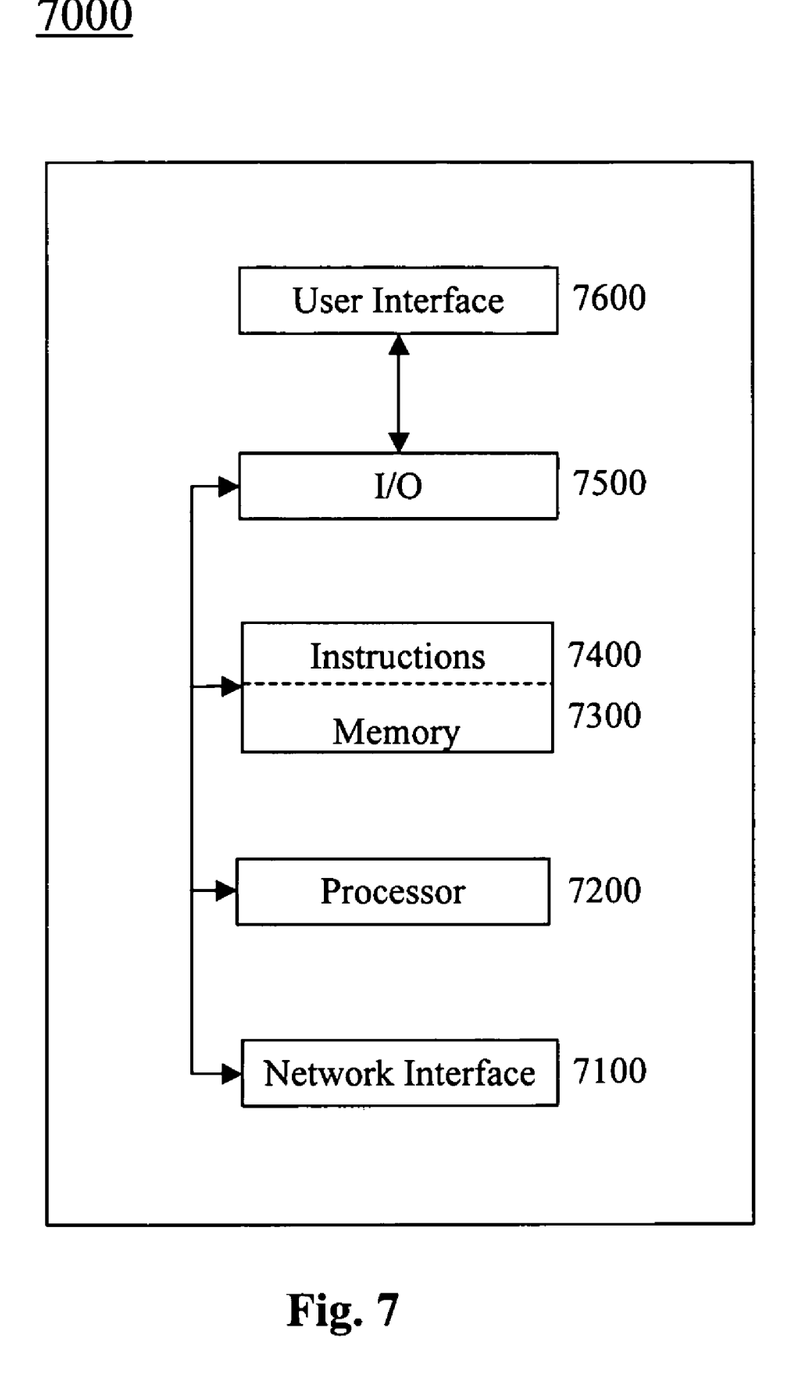
FIG. 7 is a block diagram of an exemplary embodiment of an information device 7000.

FIG. 7 is a block diagram of an exemplary embodiment of an information device 7000, which in certain operative embodiments can comprise, for example, information device 6500 and information device 6700 of FIG. 6. Information device 7000 can comprise one or more of numerous components, such as for example, one or more network interfaces 7100, one or more processors 7200, one or more memories 7300 containing instructions 7400, one or more input/output (I/O) devices 7500, and/or one or more user interfaces 7600 coupled to I/O device 7500, etc.

In certain exemplary embodiments, via one or more user interfaces 7600, such as a graphical user interface, a user can process, view, manipulate, edit, tag (e.g., assign keywords and/or descriptors to), manage, print, send, receive, and/or store a rendering of a radiographic image obtained from an exemplary imaging plate.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A system comprising:
an imaging plate exposable by an x-ray source, said imaging plate configured to be used in digital radiographic imaging, said imaging plate configured to be sufficiently flexible to enable conformal imaging of substantially non-planar objects, said imaging plate comprising:
a substantially metallic intensifier; and
a phosphor-based image storage device configured to convert electrons produced in said intensifier into light, said storage device substantially fixedly coupled to said intensifier, said storage device substantially adjacent to said intensifier, said imaging plate configured to be transportable through an optical image roller scanner without separating said intensifier from said storage device.

2. The system of claim 1, further comprising:
said x-ray source.

3. The system of claim 1, further comprising:
an optical image scanner configured to obtain image information from said imaging plate.

4. The system of claim 1, further comprising:
an information device configured to receive digital image information obtained via said imaging plate.

5. The system of claim 1, further comprising:
a memory device configured to store digital image information obtained via said imaging plate.

6. The system of claim 1, further comprising:
an output device configured to render digital image information obtained via said imaging plate.

7. The system of claim 1, further comprising:
a user interface configured to allow a user to process digital image information obtained via said imaging plate.

8. The system of claim 1, wherein a gap defines a predetermined width between at least a portion of said intensifier and at least a portion of said storage device.

9. The system of claim 1, wherein a layer defines a predetermined width between at least a portion of said intensifier and at least a portion of said storage device.

10. The system of claim 1, wherein at least a portion of said storage device is fixedly coupled to at least a portion of said intensifier sufficiently to define substantially no gap therebetween.

11. The system of claim 1, wherein said intensifier lacks a support structure.

12. The system of claim 1, wherein said storage device lacks a support structure.

13. The system of claim 1, further comprising:
a metal foil layer configured to reduce granularity artifacts of an image stored in said storage device.

14. The system of claim 1, further comprising:
a magnetic layer configured to magnetically and substantially conformally attach said imaging plate to an object.

15. A method, comprising:
conforming an imaging plate to a surface of a substantially non-planar object, said imaging plate configured to be sufficiently flexible to enable conformal imaging of said substantially non-planar object, said imaging plate comprising:
   a substantially metallic intensifier; and
   a phosphor-based image storage device configured to convert electrons produced in said intensifier into light, said storage device substantially fixedly coupled and bonded to said intensifier, said storage device substantially adjacent to said intensifier, said imaging plate configured to be transportable through an optical image roller scanner without separating said intensifier from said storage device; and
exposing said surface of a substantially non-planar object and said imaging plate to x-rays; and
storing image information regarding the substantially non-planar object in said phosphor-based image storage device.

16. The method of claim 15, further comprising:
obtaining a digital sample of said image information regarding the substantially non-planar object from said phosphor-based image storage device.

17. The method of claim 15, further comprising:
transferring a digital sample of said image information regarding the substantially non-planar object from said phosphor-based image storage device to an information device.

18. The method of claim 15, further comprising:
storing image information regarding a latent image in said phosphor-based image storage device.

19. An imaging plate, comprising:
a substantially metallic intensifier; and
a phosphor-based image storage device configured to convert electrons produced in said intensifier into light, said storage device substantially fixedly coupled to said intensifier, said storage device substantially adjacent to said intensifier;
said imaging plate configured to be used in digital radiographic imaging, said imaging plate configured to be sufficiently flexible to enable conformal imaging of a substantially non-planar object, said storage device comprising image information stored thereon regarding said substantially non-planar object, said imaging plate configured to be transportable through an optical image roller scanner without separating said intensifier from said storage device.

* * * * *